United States Patent [19]

Anderson

[11] Patent Number: 4,694,603
[45] Date of Patent: Sep. 22, 1987

[54] FISHING DEVICE

[76] Inventor: Laurel L. Anderson, 6721 23rd Ave., Kenosha, Wis. 53140

[21] Appl. No.: 817,453

[22] Filed: Jan. 9, 1986

[51] Int. Cl.⁴ ............................................. A01K 97/10
[52] U.S. Cl. ......................................... 43/21.2; 43/22
[58] Field of Search ...................... 43/21.2, 15, 17, 22, 43/23

[56] References Cited

U.S. PATENT DOCUMENTS

| | | | |
|---|---|---|---|
| 2,650,052 | 8/1983 | Bintz | 248/46 |
| 2,782,547 | 2/1957 | McMullin | 43/22 |
| 2,934,849 | 5/1960 | Kampa | 43/17 |
| 2,967,370 | 1/1961 | Bush | 43/22 |
| 2,972,204 | 2/1961 | Wollum | 43/19.2 |
| 3,159,366 | 12/1964 | Knight | 248/42 |
| 4,033,062 | 7/1977 | Denecky | 43/15 |
| 4,133,133 | 1/1979 | Casset | 43/22 |
| 4,161,839 | 7/1979 | Ward | 43/21.2 |

Primary Examiner—Gene P. Crosby
Attorney, Agent, or Firm—Wood, Dalton, Phillips, Mason & Rowe

[57] ABSTRACT

A fishing pole and reel of generally conventional construction particularly adapted for ice fishing. The fishing pole is pivotally connected in an elevated position to a supporting stand and balanced relative to the stand to provide a visual indication of a fish strike. A reel mount associated with the handle of the fishing pole provides for lengthwise adjustment of the reel relative to the handle and relative to the pivot connection of the fishing pole to the supporting stand whereby the mass of the reel functions as an adjustable counterweight to whatever amount of weight the fisherman wishes to attach to the line for rapid descent of the line to a desired fishing level. This adjustment of the reel lengthwise of the handle provides for maintaining the balance without the use of any separate added weights or adjustable weights for this purpose.

17 Claims, 9 Drawing Figures

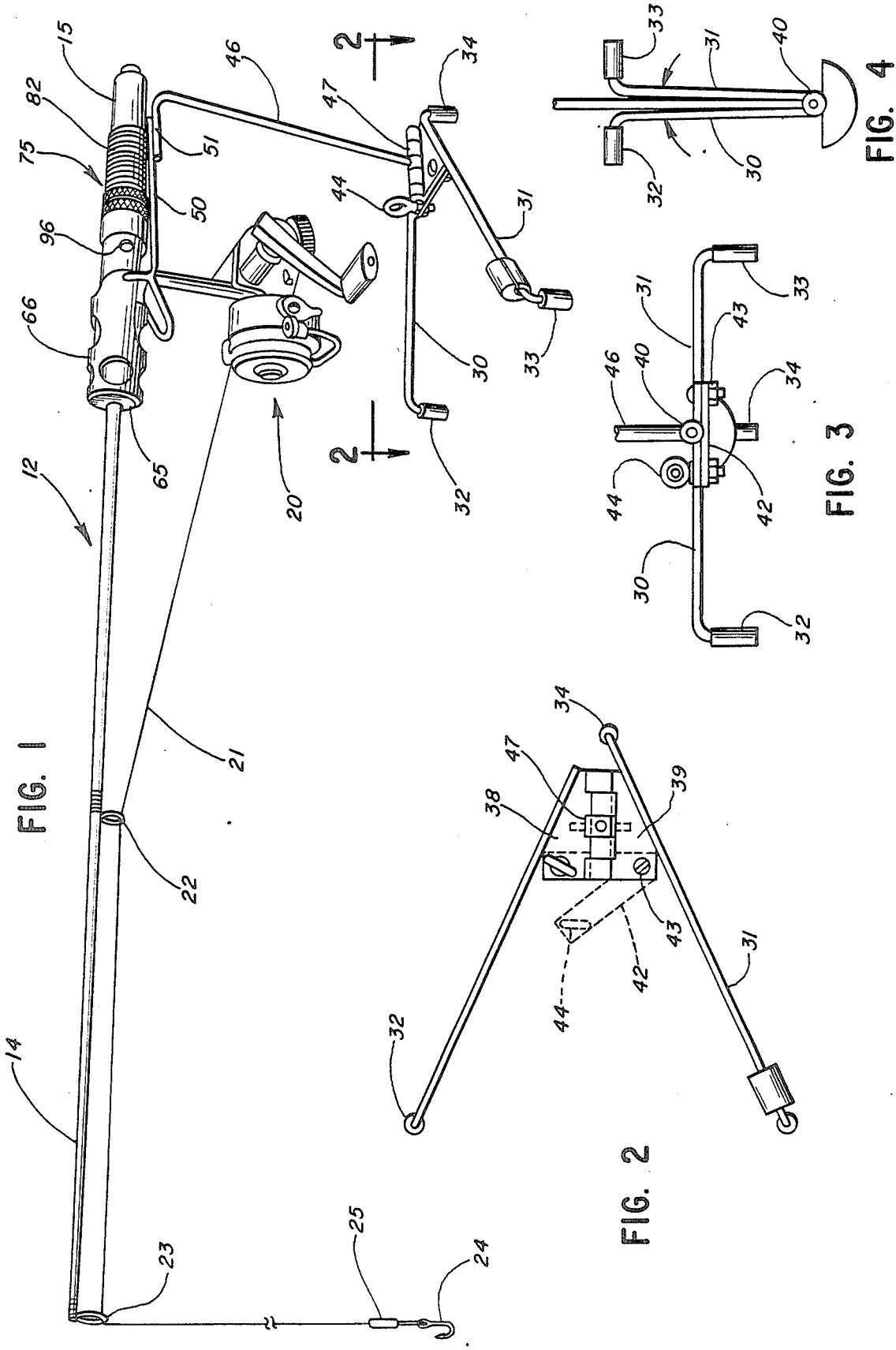

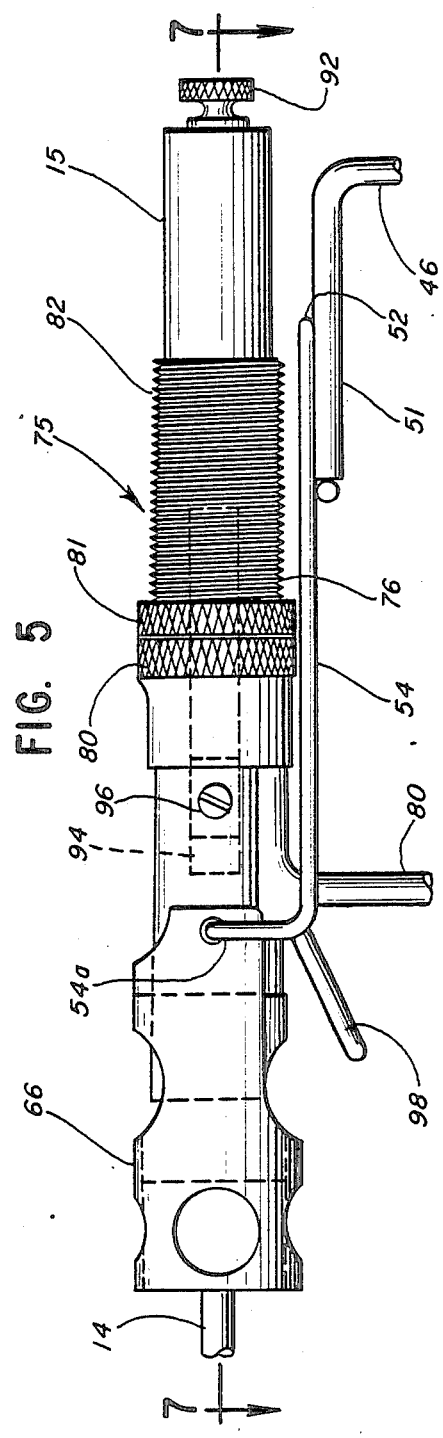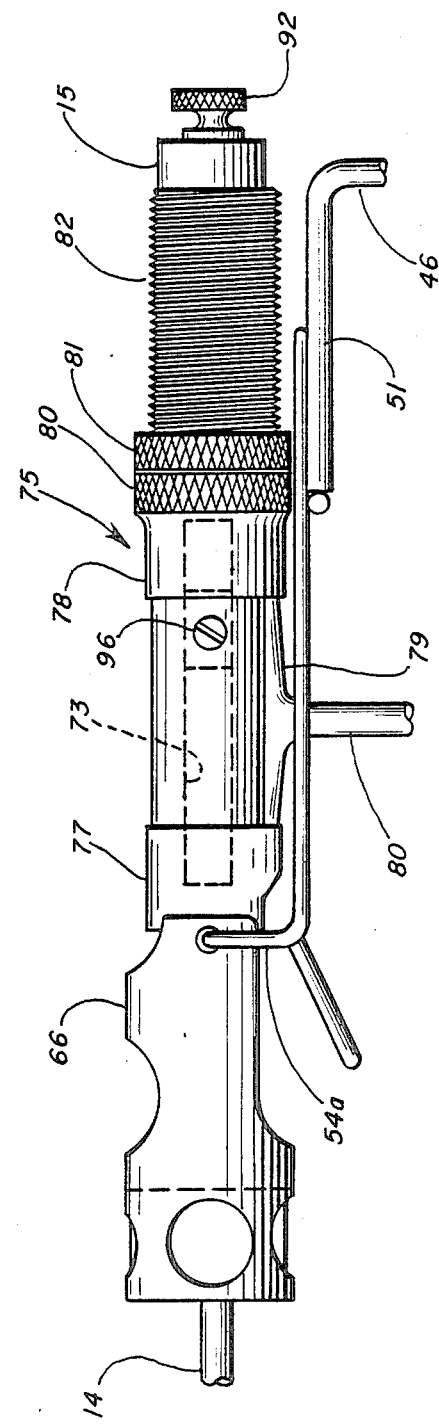

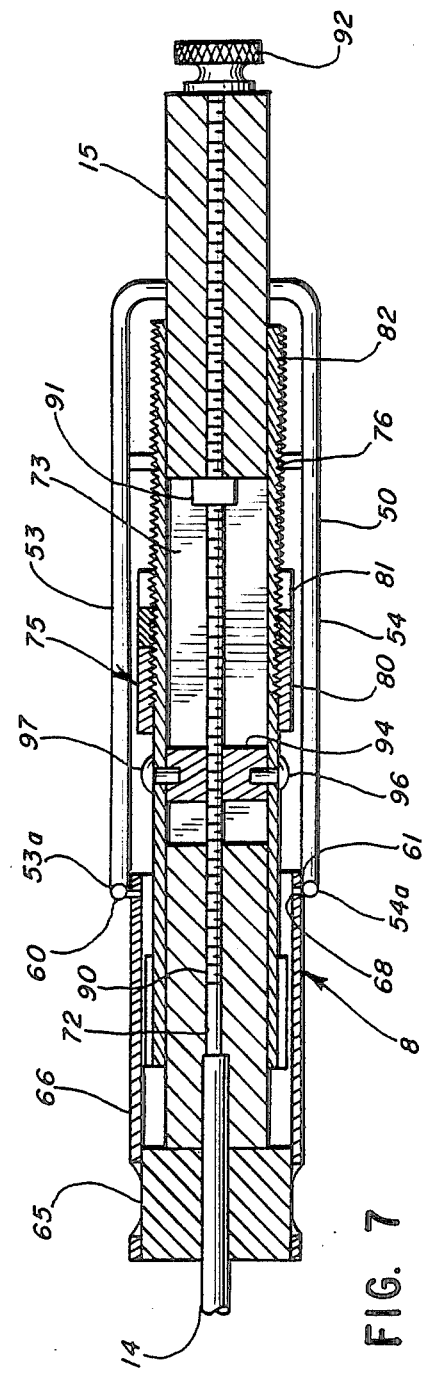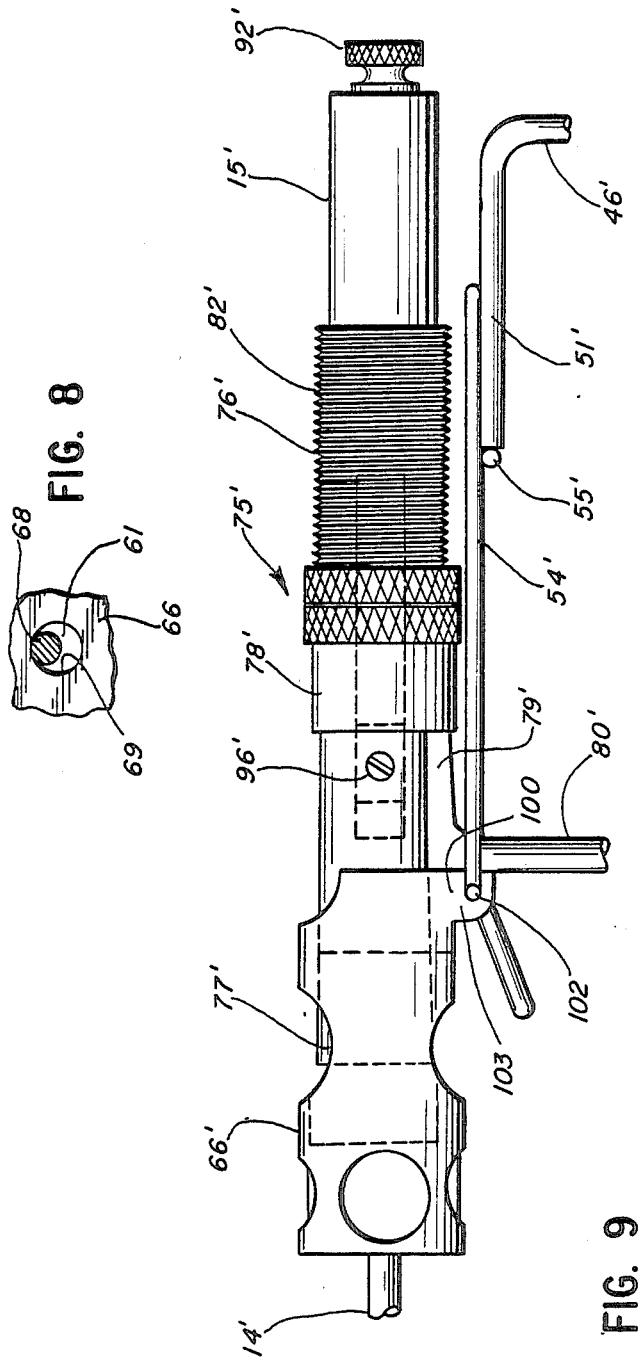

FISHING DEVICE

BACKGROUND OF THE INVENTION

This invention pertains to a fishing device having particular utility for ice fishing and which embodies structure for adjusting the mounting of a reel lengthwise of the handle of a fishing pole for pivotal balance of the fishing pole on a supporting stand.

The Bintz U.S. Pat. No. 2,650,052 discloses a fishing stand for use in ice fishing wherein a pair of pivoted legs can be positioned for engagement with the ice surface and the stand pivotally mounts a fishing rod which can be pivotally balanced on the stand by adjustment of a slidable ring lengthwise thereof.

The Kampa U.S. Pat. No. 2,934,849 discloses an ice fishing device having a fishing rod and a reel with associated structure which is pivotally balanced by means of an adjustable weight providing a counterbalance means.

The Wollum U.S. Pat. No. 2,972,204 shows an ice fishing rod supported by a stand.

The Knight U.S. Pat. No. 3,159,366 shows a holder for a fishing rod.

The Denecky U.S. Pat. No. 4,033,062 discloses a rocking-type fishing jig having a supporting stand with a pair of horizontal legs which are pivotally connected together and with a generally upright member extending upwardly from one of the legs for mounting the fishing components.

None of the foregoing patents disclose a fishing device particularly suitable for ice fishing wherein a fishing pole having a rod and a handle and a conventional reel mounted on the handle are pivotally balanced on a supporting stand for location a distance above the surface of the ice and with the balance achieved by adjustment of the reel. The balance of the fishing pole and the associated structure relative to the supporting stand about pivot connections is maintained to provide a visual signal of a fish bite by pole movement. The mounting of the reel to the handle is easily adjusted lengthwise of the handle to have the mass of the reel function as a counterweight to balance the fishing pole about the pivot connections, even with varying weights of sinker and bait.

SUMMARY OF THE INVENTION

A primary feature of the invention is to provide a fishing device particularly usable for ice fishing which provides a visual indication of a fish bite, enables playing of the fish in a conventional manner and provides greatly increased versatility in the depth of fishing. A desired amount of line can be paid out from the fishing reel and the line can have desired sinker weight thereon. A balance of the fishing pole on a supporting stand is achieved even with different weights of sinker and bait because of an adjustable mounting of the reel lengthwise of the handle to provide an adjustable mass acting as a counterweight through a variable moment arm about pivot connections of the fishing pole to the supporting stand.

The foregoing has been achieved by mounting of a fishing pole having a rod and a handle to a supporting stand by pivot connections therebetween and with a reel mount on the handle for mounting a reel in depending relation therefrom at a side of the pivot connections opposite the forward end of the fishing pole and with the reel mount being adjustable lengthwise of the handle. This enables varying the length of a moment arm about which the mass of the reel is effective to counterbalance the preselected weight of bait and sinker attached to a line whereby the fishing pole can always be in balance and a fish bite will tip the fishing pole to provide a visual indication that a fish is biting. No adjustable or added weights are required and, thus, there is no change in the overall weight of the fishing pole.

The fishing device disclosed herein provides an extremely convenient means for ice fishing. The fishing pole has a conventional reel and is supported at a convenient height above the ice surface by a supporting stand which pivotally mounts the fishing pole in a balanced condition to provide a visual indication by tipping of the pole when a fish bites. With the use of a conventional reel, the fishing can be carried out at any desired depth and the inconvenience of a cork or spring bobber is avoided, since the line can have a bait and sinker attached to the line, depending from the forward end of the pole and of a weight chosen for the desired depth of fishing and speed of descent and with the fishing pole still maintaining a balance for visual indication of a bite because of the fishing reel being adjustably mounted lengthwise of the fishing pole to provide a counterweight to the selected mass of the bait and sinker. The supporting stand is constructed to permit easy grasping of the fishing pole handle and a portion of the supporting stand for lifting of the supporting stand off the ice and playing of the fish.

The sensitivity of the disclosed fishing device is comparable to ice fishing with a tiny cork or a spring bobber. The fishing device disclosed herein has a distinct advantage over the use of a cork or bobber because of the ability to balance the pole about its pivot mounting to the supporting stand by adjustment of the reel, even with the addition of sufficient weight to the fishing line to give the capability of rapidly descending to a depth of fifty or sixty feet in a short time and have the same sensitivity as you would have with fishing at a depth of five feet and using a cork or bobber. A spring bobber is very delicate and is usually limited to a short travel and very little extra weight may be used. They are very useful to a fisherman in shallow water, maybe, up to fifteen to twenty feet maximum. In this type of fishing, it is generally easier to jerk upward with the rod tip hooking a fish and then hand-over-hand the fish line to retrieve the fish. After landing the fish, the bait is then returned through the hole in the ice and left to slowly descend while the line is paid out hand-over-hand, which may be subject to snagging on snow or ice or other equipment as well as being blown by the wind.

With the adjustable mounting of the reel on the fishing pole, a balance can be obtained without adding any weight to the fishing pole, other than the weight added by the selected sinker that is used for the desired depth of fishing. Normally, a sinker having a weight ranging from one-half ounce downwardly is selected to pull the line and bait to a desired depth in water. However, the maximum weight of the sinker to be used is determined by the mass weight of the reel being used and, therefore, a sinker of a greater weight could be used. The adjustment of the reel can be made while the fishing pole is pivotally mounted on the stand.

An object of the invention is to provide a new and improved fishing device having a fishing pole with a rod and handle and a reel mounted on the handle in combination with a supporting stand to which the fishing pole is pivotally connected and with the reel being adjustable lengthwise of the handle to vary the effectiveness of the mass thereof about the pivot connection of the pole to the stand and, thus, enable the use of various amounts of weight on a line while maintaining a balance of the fishing pole to provide a visual indication of a fish bite by tipping of the pole.

A further object of the invention is to provide a fishing device particularly useful for ice fishing comprising a supporting stand, a fishing pole having a rod and a handle, a reel mounted on said handle, means pivotally mounting the fishing pole to the supporting stand at a pivot point intermediate the reel and the forward end of the rod, and means for adjusting the mounting of the reel to the handle lengthwise of the handle to achieve a balance of the fishing pole about said pivot point.

An additional object of the invention is to provide a fishing device as defined in the preceding paragraph wherein the fishing pole has a line with bait and a sinker, and said reel is a mass movable to a position to counterbalance the weight of the bait and sinker about the pivot point.

An additional object of the invention is to provide a fishing pole having a handle with structure for adjusting the position of a reel lengthwise of the handle comprising, a reel mount movably mounted on the handle and having means for releasably engaging the foot of a reel, and manually operable means on the handle for moving the reel mount lengthwise of the handle.

Still another object of the invention is to provide new and improved pivot connections between a supporting stand and a fishing pole to minimize friction in achieving a balance of the fishing pole relative to the stand, and means enabling ready release of the pivot connection therebetween.

BRIEF DESCRIPTION OF THE DRAWINGS

FIG. 1 is a perspective view of the fishing device shown positioned for use;

FIG. 2 is a plan section taken generally along the line 2—2 in FIG. 1 and on an enlarged scale;

FIG. 3 is a fragmentary front elevational view of the supporting stand in operative position;

FIG. 4 is a fragmentary view of the supporting stand shown in folded position;

FIG. 5 is a fragmentary side elevational view of the one embodiment of the fishing device;

FIG. 6 is a view similar to FIG. 5 differing in the position of the reel mount for a fishing reel;

FIG. 7 is a sectional view, taken generally along the line 7—7 in FIG. 5;

FIG. 8 is a fragmentary section, taken along the line 8—8 in FIG. 7; and

FIG. 9 is a view, similar to FIG. 5, of a different embodiment of the invention.

DESCRIPTION OF THE PREFERRED EMBODIMENTS

The fishing device is shown generally in FIG. 1 and has, as its primary components, a supporting stand, indicated generally at 10, which pivotally mounts at an elevated position a balanced fishing pole, indicated generally at 12, having a rod 14 extending forwardly from a handle 15. A reel, indicated generally at 20, depends from the handle of the fishing pole and is carried thereby in a unique manner to be described and has a line 21 extending through eyes 22 and 23 of the rod 14, with the eye 23 being at the forward end of the rod and with the line depending downwardly therefrom and as shown having a hook 24 and a sinker 25.

The supporting stand 10 is shown particularly in FIGS. 1-4 and has a pair of legs 30 and 31, with the leg 30 having a depending foot 32 and the leg 31 having the depending feet 33 and 34. The three depending feet provide a three-point support for the supporting stand 10 on the ice surface.

A pair of pivotally-connected hinge leaves 38 and 39 have the respective legs 30 and 31 fixed thereto for pivoting about a hinge axis 40 between the operative position, shown in FIGS. 1-3, and an inactive, folded position, shown in FIG. 4. The hinge leaves are retained in a folded-out operative position, as shown in FIGS. 1-3 by a bar 42 pivoted at 43 to the hinge leaf 39 and having a bolt 44 which can fit within a recess in the hinge leaf 38 and be tightened to hold the bar in fixed relation with the hinge leaves.

An elevated mounting structure overlies the legs 30 and 31 of the supporting stand and is affixed to an upwardly-extending rod 46 having a tubular member 47 at its lower end rotatable upon the hinge pin of the hinge having the leaves 38 and 39. A semicircular plate 48 on the underside of the tubular member 47 can engage the underside of the hinge leaves 38 and 39 to assure that the rod 46 extends vertically upward with a slight inclination to the rear of the supporting stand in order to locate the mounting structure in generally superimposed relation to the legs 30 and 31.

Referring particularly to FIGS. 1, 5 and 7, the mounting structure comprises a generally U-shaped member 50, formed of metal rod stock, which is welded to a forwardly-turned, upper end 51 of the rod 46, as seen at 52, and which has the legs 53 and 54 thereof welded to a cross rod 55 welded to an end of the forwardly turned upper end 51. The legs 53 and 54 are shown extending in generally parallel relation with upward extensions 53a and 54a providing a pair of pivot connections 60 and 61 to the fishing pole. However, these legs can be more closely spaced together and have their forward ends flared outwardly to provide the same spacing between the upward extensions 53a and 54a. As an example, the legs 50 and 53 could be spaced apart a distance equal to the diameter of the fishing pole handle 15 to further facilitate manual grasping of the mounting structure and the handle 15 in reeling in a fish, as to be later described.

The particular construction of the fishing pole used to illustrate the invention has a handle 15 with an enlarged forward end 65 from which the rod 14 extends and onto which is fitted a tubular pivot bracket 66 which pivotally coacts with the mounting structure 50 at the pivot connections 60 and 61. These pivot connections are defined by a pair of spaced-apart, inwardly-extending pins on the mounting structure leg upward extensions 53a and 54a which extend into enlarged openings in the pivot bracket 66. The structure of both these pivot connections is the same, with the pivot connection 61 being shown particularly in FIG. 8. A pivot pin 68 extends inwardly from the mounting structure leg extension 54a and into an opening 69 in the pivot bracket 66. The opening 69 is of a diameter greater than that of the pivot pin 68 whereby a line contact is established between the pin and the wall of the opening 69 to minimize the frictional resistance to relative pivoting between the fishing pole and the supporting stand.

The handle 15 has a tubular passage 72 extending lengthwise thereof and an internal slot 73 intermediate its ends.

A reel mount, indicated generally at 75, is mounted on the handle 15 for movement lengthwise thereof, with two different positions thereof being illustrated in FIGS. 5 and 6. The reel mount 75 has a tubular sleeve 76 slidably fitted on the handle 15 with a pair of collars 77 and 78 for mounting the reel 20 to the rod by coaction with a reel foot 79 associated with a reel stem 80. The collar 77 is fixed to the sleeve 76 and is of an outer diameter smaller than the inner diameter of the pivot bracket 66 whereby it can be positioned interiorly thereof, as seen in FIG. 5. The collar 78 is loosely mounted on the sleeve 76 of the reel mount for movement to a position having increased distance from the fixed collar 77 for release of the reel foot 79. This movable collar can be held in foot-retaining position, as seen in the drawings, by a pair of internally threaded locking rings 80 and 81 which are threadably mounted on a threaded section 82 of the reel mount sleeve 76.

The reel mount 75 is adjustable lengthwise of the handle 15 in order to provide for a balance of the fishing pole about the pivotal connection to the supporting stand while enabling the use of different amounts of weight on the line 21. This maintenance of balance is achieved by lengthwise adjustment of the mass of the fishing reel 20 relative to the handle to vary the moment arm of said mass relative to the pivotal connection of the fishing pole to the supporting stand. When very little weight is associated with the line 21, the reel 20 is relatively close to the pivot mounting, as seen in FIG. 5. When substantially more weight is associated with the line 21, the reel is moved to a greater distance from the pivot connections, as seen in FIG. 6. The mass of the reel is used as a counterweight relative to the amount of weight associated with the line.

Means for adjusting the reel lengthwise of the handle and, more particularly, adjusting the reel mount comprises a rotatable threaded member 90 in the form of an elongate bolt extending through the passage 72 of the handle as well as through the internal slot 73 and to the rear end of the handle. This rotatable member is held against movement lengthwise of the handle by means of an internal member 91 and a knurled adjustment knob 92 fixed to an end of the member 90 abutting against portions of the handle. With this structure, rotatable member 90 can be rotated by rotating the knob 92 to achieve movement of a second threaded connecting member 94 lengthwise of the internal slot 73 and which is threaded onto the rotatable member 90. This connecting member 94 is in the form of a block slidably captured between the walls of the internal slot 73 to prevent rotation thereof and has a threaded opening at each of its opposite ends to receive the respective threaded members 96 and 97 which extend through openings in the reel mount sleeve 76.

Rotation of the knob 92 imparts longitudinal movement to the connecting member 94 within the internal slot 73 of the handle and resulting linear movement of the reel mount relative to the handle to adjust the location of the reel 20 relative to the pivotal mounting of the fishing pole to the supporting stand.

A downwardly angled, U-shaped member 98 extends forwardly from the mounting structure legs 53 and 54 to limit counterclockwise pivoting of the fishing pole, as seen in FIG. 1, when a fish strikes.

A second embodiment of the invention is shown in FIG. 9 which differs from the first embodiment only with respect to the location of the pivot connection between the supporting stand and the fishing pole. Those components in the embodiment of FIG. 9 which are the same as in the embodiment of FIGS. 1–8 have been given the same reference numeral with a prime affixed thereto.

In this embodiment, the pivot pins which form part of the pivot connections for the fishing pole to the supporting stand extend outwardly from the legs of the mounting structure and at the level thereof, rather than at a higher level, and are received in openings formed in ears depending from the pivot bracket 66'.

More particularly, the structure associated with the mounting structure leg 54' includes an outwardly-extending pivot pin 100 positioned within an enlarged opening 102 formed in an ear 103 depending downwardly from the pivot bracket 66'. A similar structure is associated with the other leg of the mounting structure. In this embodiment, the legs of the mounting structure can be closer together than as shown in the first embodiment and they can be squeezed together to draw the pivot pins toward each other to release the connection thereof to the pivot bracket 66'.

The disclosed fishing device supports a fishing pole at a desired height while ice fishing and enables various weights to be used, while achieving a balance of the fishing pole in all situations to provide a visual indication of a fish bite by tipping of the fishing pole. Following a strike, the fisherman can grasp the handle 15 and the mounting structure 50 of the supporting stand in one hand and fish in a normal manner, particularly since the supporting stand is lightweight and does not interfere with operation of the reel 20.

The pivot brackets 66 and 66' have been shown as elements separate from the fishing pole. However, it is within the scope of the invention to have the function of these pivot brackets performed by structure integral with the handle of the fishing pole as, for example, if the handle were made of a one-piece plastic construction.

I claim:

1. A fishing device particularly useful for ice fishing comprising a supporting stand, a fishing pole having a rod and a handle, a reel mounted on said handle, means pivotally mounting the fishing pole to the supporting stand at a pivot point intermediate the reel and the forward end of the rod, and means for adjusting the mounting of the reel to the handle lengthwise of the handle to achieve a balance of the fishing pole about said pivot point.

2. A fishing device as defined in claim 1 wherein the fishing pole has a line with bait and a sinker, and said reel is a mass movable to a position to counterbalance the weight of the bait and sinker about the pivot point.

3. A fishing device having a supporting stand, a fishing pole with a rod and handle, and a fishing reel, in combination, the improvement comprising, a pivot bracket attached to said fishing pole, means pivotally mounting the pivot bracket on said supporting stand, and means on said handle for holding the fishing reel depending therefrom and adjustable lengthwise of the handle to vary the moment arm of the fishing reel mass relative to said pivotal mounting means.

4. A fishing device as defined in claim 3 wherein said rod and handle are at opposite sides of the pivotal mounting means.

5. A fishing device as defined in claim 3 wherein said fishing reel holding means is adjustable by means including a rotatable threaded member extending lengthwise of said handle, and a second threaded member on said rotatable threaded member and connected to said fishing reel holding means.

6. A fishing device as defined in claim 5 wherein said handle has an internal slot extending lengthwise thereof and said second threaded member is slidable along said internal slot and held against rotation by said internal slot.

7. A fishing device as defined in claim 3 wherein said pivotal mounting means comprises a pair of spaced-apart pins on said supporting stand which extend toward each other, and a pair of openings in said pivot bracket each receiving one of said pins and being of a diameter greater than said pins to have a line contact between a pin and the wall of an opening.

8. A fishing device as defined in claim 7 wherein said supporting stand has a pair of spaced-apart arms each mounting one of said pins, and said arms having sufficient flexure to enable increasing the distance between said pins to release said pivot bracket.

9. A fishing device for ice fishing enabling the optional use of a sinker on a line and which provides a visual indication of a fish bite by tipping of a balanced pivotally mounted fishing pole having a rod and a handle mounting a reel comprising, a supporting stand having an elevated mounting structure, means located between the forward end of the fishing pole and the reel pivotally connecting said fishing pole to said elevated mounting structure, and means for adjusting the position of the reel on the handle lengthwise thereof to achieve a balance about the pivotal connection between the weight of the reel and the weight of the sinker and bait on the line.

10. A fishing device as defined in claim 9 wherein said adjusting means comprises a reel holder movable on the handle, and manually operable means connected between the handle and the reel holder to achieve said adjustment.

11. A fishing device as defined in claim 9 wherein said elevated mounting structure comprises means extending generally horizontally beneath said handle and spaced therefrom when a balance exists and engageable within a user's hand along with the handle when the fishing pole and supporting stand are picked up to reel in a fish.

12. A fishing device as defined in claim 9 wherein the body of said fishing reel is positioned below said handle and at a distance from said mounting structure.

13. A fishing device as defined in claim 9 wherein said mounting structure has a part extending forwardly of said pivotal connection to limit downward pivoting of said rod.

14. A fishing device as defined in claim 9 wherein said pivotally connecting means includes a pair of pins and associated openings associated with the mounting structure and the fishing pole and the openings being of a diameter greater than the pins to provide line contact between the pins and the walls of the openings and minimal resistance to pivoting of the fishing pole.

15. A fishing pole having a cylindrical handle with structure for adjusting the position of a reel lengthwise of the handle comprising, a tubular reel mount slidably fit on the handle and having means for releasably engaging the foot of a reel, said handle having an elongate internal slot, and manually operable means on said handle for moving the reel mount lengthwise of the handle including a connecting member movable lengthwise of said internal slot and connected to said reel mount.

16. A fishing pole as defined in claim 15 wherein said manually operable means includes a rotatable threaded member extending along the internal slot and to an end of the handle, means preventing lengthwise movement of said rotatable threaded member, and said connecting member being threaded on said rotatable threaded member and confined in said internal slot against rotation with said rotatable threaded member.

17. A fishing pole as defined in claim 16 and which can be pivotally mounted to a supporting stand for ice fishing by structure comprising means defining a pair of pivot connections located intermediate the forward end of the fishing pole and the reel, and a supporting stand having means to coact with said pivot connections and enable balance of the fishing pole about the pivot connections by said movement of the reel mount lengthwise of the handle.

* * * * *